(12) United States Patent
Martin

(10) Patent No.: US 8,668,984 B2
(45) Date of Patent: Mar. 11, 2014

(54) MULTILAYER COMPOSITE

(75) Inventor: Donald H. Martin, Asheville, NC (US)

(73) Assignee: WNC Solar, LLC, Asheville, NC (US)

( * ) Notice: Subject to any disclaimer, the term of this patent is extended or adjusted under 35 U.S.C. 154(b) by 0 days.

(21) Appl. No.: 13/250,397

(22) Filed: Sep. 30, 2011

(65) Prior Publication Data

US 2012/0090669 A1    Apr. 19, 2012

Related U.S. Application Data

(60) Provisional application No. 61/455,141, filed on Oct. 14, 2010.

(51) Int. Cl.
*B32B 5/16* (2006.01)

(52) U.S. Cl.
USPC ............ 428/323; 428/419; 428/457; 428/469; 428/472.2; 136/250; 136/263

(58) Field of Classification Search
USPC .......... 136/243, 263, 252, 256, 250; 428/469, 428/232, 419, 457, 472.2
See application file for complete search history.

(56) References Cited

U.S. PATENT DOCUMENTS

| | | | |
|---|---|---|---|
| 3,871,881 A * | 3/1975 | Mikelsons | 430/60 |
| 4,214,916 A | 7/1980 | Felsher | |
| 4,342,044 A * | 7/1982 | Ovshinsky et al. | 257/54 |
| 4,749,454 A * | 6/1988 | Arya et al. | 205/656 |
| 5,986,206 A | 11/1999 | Kambe | |
| 7,071,406 B2 | 7/2006 | Smalley | |
| 7,235,736 B1 | 6/2007 | Buller | |
| 7,327,556 B2 | 2/2008 | Ro | |
| 7,645,933 B2 | 1/2010 | Narkis | |
| 7,858,876 B2 | 12/2010 | Lagally | |
| 7,872,191 B2 | 1/2011 | Usui | |
| 2005/0238885 A1 | 10/2005 | Takeda | |
| 2005/0244660 A1* | 11/2005 | Yuasa et al. | 428/457 |
| 2007/0204904 A1 | 9/2007 | Brooks | |
| 2008/0083454 A1 | 4/2008 | Park | |
| 2008/0245415 A1 | 10/2008 | Kim | |
| 2009/0211632 A1* | 8/2009 | Brett et al. | 136/256 |

OTHER PUBLICATIONS

"Black Pearls 2000," obtained Sep. 22, 2012, Cabot Corporation, http://www.cabot-corp.com/wcm/download/en-us/rb/BLACK_PEARLS_2000.pdf.*
N. Steiner, "Homemade Zinc Oxide Rectifier Diode," Published Dec. 2012, http://sparkbangbuzz.com/zinc-oxide-diode/zinc-oxide-diode.htm.*
C. Starr, "The Copper Oxide Rectifier," Published Jan. 1936, Journal of Applied Physics, vol. 7, Issue 1, pp. 15-19.*

(Continued)

*Primary Examiner* — Callie Shosho
*Assistant Examiner* — Nicholas Kokkinos
(74) *Attorney, Agent, or Firm* — Yancy IP Law, PLLC

(57) ABSTRACT

A multilayer composite includes a metal substrate layer, an electrically insulating layer directly disposed on the metal substrate layer, and a light absorbing layer directly disposed on said electrically insulating layer. In one embodiment, the light absorbing layer includes carbon black. This multilayer composite is bifunctional having the characteristics of both energy generation upon the absorption of electromagnetic radiation of the solar spectrum (making it useful as the photovoltaic component of a solar cell) and electrical energy storage. Therefore, in one embodiment, the multilayer composite is included in a solar cell.

17 Claims, 1 Drawing Sheet

(56) References Cited

OTHER PUBLICATIONS

Brock, Groteklaes, Mischke, "European Coatings Handbook," Published in 2000 (month unknown), Published by Curt R. Vincentz Verlag, Hannover, p. 117.*

Walker, et al., "Transient Photocurrents in Dye-Sensitized Nanocrystalline Solar Cells", Transformation and the Storage of Solar Energy, CHIMIA 2007, 61, No. 12, p. 792-795 (2007).

Thornton, "Modern Physics for Scientists and Engineers", Saunders College Publishing, 1993, p. 419, pp. 388-393.

Brabec, Organic Photovoltaic: Materials, Device Physics, and Manufacturing Technologies, Wiley-VCH, 2008, p. 553.

Donnet, "Carbon-Black: Science and Technology, 2nd edition", Mercel Dekker, Inc., 1993 p. xvii, p. 113, p. 271, pp. 284-285.

Nelson, "The Physics of Solar Cells", Imperial College Press, 2003, p. 98.

Sheasby, "The Surface Treatment and Finishing of Aluminum and Its Alloys", Finishing Publication Ltd., 6th Edition, vol. 1, 2001, pp. 233-238, p. 338.

* cited by examiner

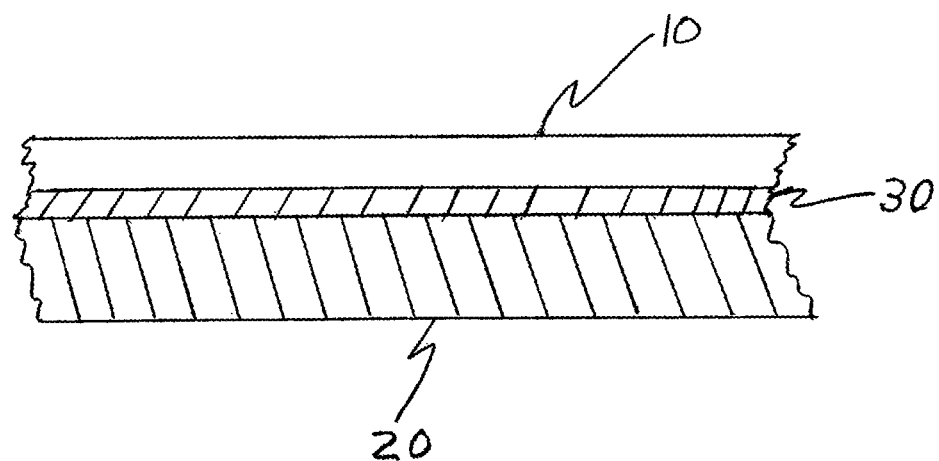

MULTILAYER COMPOSITE

CROSS-REFERENCE TO RELATED APPLICATION

This patent application claims priority under 35 U.S.C. 119(e) of U.S. Provisional Patent Application No. 61/455,141 filed Oct. 14, 2010, the entire contents of which are expressly incorporated herein by reference.

BACKGROUND OF THE INVENTION

A large fraction of the energy consumption of the world is utilized to generate electrical power. However, two of the major methods of generating that power, nuclear fission and combustion of fossil fuels, have significant problems.

The major problems of fossil fuel based electrical power generation include: (1) the earth's limits to fossil fuel supply, and (2) the generation of the greenhouse gas carbon dioxide from the oxidation of fossil fuels.

The major problems with generating electrical power by nuclear fission are often cited to be: (1) disposal of hazardous wastes and (2) potential issues of plant safety.

Generation of electrical power directly from sunlight via solar cells offers great potential as a source for the world's future energy supply and does not have the problems noted above.

However, the current higher cost (compared to fossil fuels and nuclear fission) of electrical power via solar cells precludes its use in many applications. A major opportunity exists for new technology combining lower cost materials and more environmentally friendly processes for making solar cells which would result in significantly lower cost electrical energy.

A further need for more effective energy usage from solar cells requires the storage of energy for use in periods of very little to no sunlight.

As used herein, the electromagnetic radiation from the sun incident upon the surface of the earth is defined as the solar spectrum. This spectrum has a wavelength distribution from about 2000 to 800 nanometers (the near infrared range) through 800 to 400 nanometers (the visible range) and a small amount from 400 to 300 nanometers (the ultraviolet range). As used herein, photovoltaic is a term describing a structure which absorbs radiation of the solar spectrum and directly produces voltage and current. As used herein, a solar cell is a current and voltage producing device which includes a structure having photovoltaic capability.

From a broad perspective there are three major requirements for a useful photovoltaic component of a solar cell:

1. A material which absorbs, in a practical thickness, a useful amount of radiation of the solar spectrum.

2. Properties of this material and an arrangement relative to at least one second material providing a mechanism whereby this absorbed radiation produces negative and positive charges which can be separated.

3. A pathway through which the separated negative and positive charges produce current and voltage at useful levels which can be utilized in an external circuit.

In current solar cell technologies the components providing the photovoltaic effect can be arranged in several different geometries (Stephen T. Thornton and Andrew Rex, *Modern Physics for Scientists and Engineers,* 2nd ed., 1993, p. 419). One of the well-known arrangements of materials utilizes a metal joined to a semiconductor forming a junction known as an MS junction. This interface between the metal and the semiconductor is termed a Schottky barrier junction. A variation of this arrangement is one in which an electrical insulator is inserted between the metal and semiconductor forming an MIS junction. Both of these material arrangements have limitations in cost and/or performance which limit their usefulness in solar cells.

The predominant solar cell technology in the current market is based on the semiconductor crystalline silicon. In this technology thin wafers are made in which one side of the wafer is doped with a material to provide an excess of negative charge carriers (an n-doped material) and the other side of the wafer is doped with a material to provide an excess of positive charge carriers (a p-doped material) so that the structure forms a p-n junction. The p-n junction is an interfacial boundary which leads to the electrical asymmetry to separate the positive and negative charges upon the absorption of light (a requirement as noted above).

This silicon based technology has some severe limitations. The relatively small silicon wafers are made in a batch process which requires major capital investment cost per unit of production (Christoph Brabec, Vladimir Dyakonov, and Ullrich Scherf, eds., *Organic Photovoltaics: Materials, Device Physics, and Manufacturing Technologies*, Wiley-VCH, 2008, p. 553). This approach has major difficulties to reach the very large volume production at low costs which will be required to make electricity from solar cells on very large scales. Some estimates place the potential for electricity from solar cells to require an installed area of 100,000 $km^2$ in fifty years.

Among the different configurations and materials for making solar cells is a more recently used design based on conducting polymers or a conducting polymer and a spherical fullerene compound derivative. This more recent technology utilizes organic electron donors and electron acceptors which are intimately blended in a single layer and show electron transfer upon absorption of radiation of the solar spectrum. This technology which is frequently referred to as Organic Photovoltaics (OPV) holds promise for some reduced cost and more manufacturing flexibility. For example, it is much more amenable to roll to roll high volume production in sheet form utilizing printing technology.

However, OPV technology also has several limitations. These devices frequently use materials which at this time are made by processes which are not well developed at the scales necessary for low cost production. Furthermore, the processes for making the organic films for these technologies rely on organic solvents. These solvents (while safer than many) pose significant potential environmental impacts when used at the scales which will be necessary to make very large volumes of these devices.

Furthermore, some of these organic materials (polymers and lower molecular weight organic molecules) are susceptible to degradation under the action of radiation of the solar spectrum and chemical degradation from atmospheric oxygen.

SUMMARY OF THE INVENTION

The present invention is a multilayer composite comprising a metal substrate layer, an electrically insulating layer directly disposed on the metal substrate layer, and a light absorbing layer directly disposed on the electrically insulating layer. In one embodiment of the present invention, the light absorbing layer includes carbon black. This multilayer composite is bifunctional having the characteristics of both energy generation upon the absorption of electromagnetic radiation of the solar spectrum (making it useful as the photovoltaic component of a solar cell) and electrical energy storage. Therefore, in one embodiment, the multilayer composite is included in a solar cell.

BRIEF DESCRIPTION OF THE DRAWINGS

The features and advantages of the present invention will become apparent from the following detailed description of a preferred embodiment thereof, taken in conjunction with the accompanying drawings, in which:

the figure is a schematic drawing illustrating a multilayer composite having a light absorbing layer including carbon black 10, a metal substrate 20 and an electrically insulating layer 30 in accordance with a preferred embodiment of the present invention.

DETAILED DESCRIPTION OF THE INVENTION

As depicted in the figure, the multilayer composite of this invention is comprised of a metal substrate layer 20, an electrically insulating layer 30 directly disposed on the metal substrate 20, and a light absorbing layer 10 directly disposed on the electrically insulating layer 30. In one embodiment of the invention, the light absorbing layer 10 includes carbon black. As defined herein, the term "directly disposed" means that no intervening material is provided between the recited layers. In one embodiment of the present invention, the multilayer composite is included in a solar cell or a photovoltaic device.

In accordance with one embodiment of the invention wherein the light absorbing layer 10 includes carbon black (herein referred to as the "carbon black layer"), the multilayer composite, as made, shows a voltage difference between the carbon black layer and the metal substrate layer of the multilayer composite. This voltage can be reduced by electrical discharge of the multilayer composite. However, the voltage is regenerated by re-equilibration, even in dim light, when the discharge route circuit is open. As provided herein, the steady state voltage difference between the outer surface of the carbon black layer and the outer surface of the metal substrate layer achieved in dim light in the re-equilibration process is defined as re-equilibration voltage. In one embodiment of the present invention, the re-equilibration voltage is at least 100 millivolts for the multilayer composite and a re-equilibration voltage of at least 500 millivolts is preferred.

The multilayer composite of the present invention can also be viewed as a parallel plate capacitor in which the metal substrate layer is one plate and the preferred carbon black layer is the other plate with the intervening electrically insulating layer. This re-equilibration of the discharged multilayer composite (which restores its voltage) can be considered a self-charging effect so that the multilayer composite acts like a self-charging capacitor. In addition, the multilayer composites of this invention show in dim light retention of the voltage over extended periods of time. In this respect the multilayer composites show energy storage characteristics useful in solar cells.

As previously mentioned, one embodiment of the present invention includes carbon black in the light absorbing layer (referred to herein as the "carbon black layer"). In one embodiment of the present invention, the carbon black layer includes only carbon black particles or carbon black particles coated with a coating agent as further provided herein.

Carbon blacks are described as " . . . essentially consisting of elemental carbon in the form of near spherical particles of colloidal size, coalesced into particle aggregates and agglomerates, and are obtained by the partial combustion or thermal decomposition of hydrocarbons", (Jean-Baptiste Donnet, Roop Chand Bansal and Meng-Jiao Wang, eds., *Carbon Black: Science and Technology,* 2nd Edition, Marcel Dekker, Inc., 1993, p. xvii).

As noted in the description above, the known commercially utilized processes for making carbon black typically produce primary particles which are essentially spherical. In one embodiment of the present invention, the primary particles of carbon blacks have a diameter in the range of 10 to 50 nanometers. In these production processes, groups of these primary particles further "tack" together into structures called aggregates.

These aggregates are three dimensional and can be viewed as rigid branched strings of connected balls with open spaces or voids within the outer effective surface of the aggregate. These voids between the particles within an aggregate are defined herein as inter-particle voids. The inter-particle voids have dimensions in the order of a few to many nanometers. In addition to the inter-particle voids, carbon blacks in accordance with one embodiment of this invention have varying degrees of very small (<~2 nanometer wide) voids within the primary particles. These voids are defined herein as intra-particle voids or microvoids. The dry state low bulk density of these carbon blacks is a result of the inter and intra particle voids.

In most carbon blacks, as commercially supplied, the aggregates are clumped together into collections referred to herein as agglomerates. In an effective dispersion process the agglomerates are typically subdivided into individual aggregates. The aggregate is the smallest carbon black entity which can be dispersed as a separate body without utilizing extensive mechanical fracture and can be considered a fundamental carbon black unit. The aggregates of the carbon blacks in accordance with one embodiment of this invention have equivalent diameters in the range of a few 100 to several 100s of nanometers. The aggregate structures of the carbon blacks in accordance with one embodiment of this invention have extensive void volume with the effective volume of the aggregate 3 to 10 times the volume of carbon black in the aggregate.

A useful way of clearly describing the thickness of a carbon black layer is as if the layer were a continuous region of solid carbon black with no voids. The carbon black layer thickness is that length traversed through carbon black only perpendicular to the plane of the carbon black layer as viewed from the carbon black layer outer surface to the carbon black layer inner surface. This is the definition of "carbon black layer thickness" as used herein.

The carbon blacks of this invention absorb a useful range of light of the solar spectrum. The structure of carbon blacks is such that they have significant absorption of light in the infrared, visible and ultraviolet regions of the solar spectrum (Donnet, op. cit. p. 113).

The light absorption of materials used as the light absorbing medium in solar cells is often characterized by a quantity known as absorption length. This length is the depth of material (at that specific wavelength of light) which is sufficient to reduce the transmitted light to 1/e (36.8%) of its incident intensity (Jenny Nelson, *The Physics of Solar Cells,* Imperial College Press, 2003, p. 98). The carbon blacks in accordance with one embodiment of this invention (considering inter and intra-particle voids to have 100% transmission) generally have absorption lengths of 30 to 80 nanometers for 700 nanometer wavelength light. This wavelength is close to the energy mid-point of radiation of the solar spectrum.

The light absorption properties of the carbon blacks useful for this invention meet the first of the photovoltaic component requirements (light absorption properties) noted in the BACKGROUND section above.

The separation of positive and negative charges generated by the absorption of light by the carbon blacks provided in accordance with one embodiment of this invention appears to be a key and enabling feature of the multilayer composite of this invention. It is achieved by an electrical asymmetry which results in opposite directions for the flow of negative and positive charges. The method of achieving the asymmetry in this invention is via the use of an intervening electrically insulating layer between the carbon black layer and the metal substrate layer. This electrically insulating layer has the characteristic of rectification and provides to the multilayer composite, as made, a resulting net charge imbalance between the metal and carbon black. As used herein, rectification is defined as the property of a layer such that the resistance to charge flow in one direction across the layer is different from the resistance for that charge flow in the opposite direction.

The capability to achieve electrical asymmetry provides the route to achieve the second of the three requirements (charge separation) as noted in the Background section.

Carbon black (unlike most organic compounds and polymers) has a significant level of electrical conductivity. A common way of characterizing electrical conductivity is as its specific resistivity (the reciprocal of specific conductivity). The specific resistivity of carbon blacks is in the range of 0.01 to 10 ohm-cm (Donnet, op. cit., p. 271) which lies between the specific resistivities of conducting metals such as silver (which has a specific resistivity in the range of $10^{-6}$ ohm-cm) and the specific resistivity of organic compounds and organic polymers (most of which have specific resistivities in the range of $10^{12}$ to $10^{16}$ ohm-cm). This intermediate range of specific resistivity is typical of semi-conductors. However, considered from the perspective of the band theory of electrical conductivity in solids (Thornton, op. cit., pp. 388-393) carbon blacks have a very low energy gap so that they have significant conductivity at moderate ambient temperatures and can be categorized, not as semi-conductors, but as semi-metals.

The electrical conductivity of these carbon blacks is instrumental in providing the third of the three requirements (a current pathway) noted in the BACKGROUND section above.

Carbon blacks can be categorized based on the type of production process used to make them or upon their end uses or upon their primary physical and chemical properties. About 90% of carbon blacks produced worldwide are used in rubber (tires and other rubber goods) and about 10% in non-rubber applications as pigments for plastics, printing inks, coatings and other pigment uses.

Among the wide range of types of carbon blacks for pigment applications are those which are more effective in conferring greatly increased electrical conductivity when added to very low conductivity materials such as organic polymers. Carbon blacks in this category are generally referred to as conductive carbon blacks. Typical of such conductive blacks are PRINTEX L6, PRINTEX XE2 and PRINTEX XE2-B (Evonik Industries), VULCAN XC-72 and BLACK PEARLS 2000 (Cabot Corporation) and KETJENBLACK EC300J and KETJENBLACK EC600JD (Akzo Nobel). Among conductive blacks are those which yield yet higher conductivities when dispersed in polymeric materials and are described as extra-conductive blacks. PRINTEX XE2-B, BLACK PEARLS 2000 and KETJENBLACK EC600JD are such extra-conductive carbon blacks and are preferred for making the carbon black layer in the multi-layer composite of this invention. However, it is understood by those of skill in the art that other forms of carbon blacks may be used in the invention described herein.

The extra-conductive carbon blacks can be characterized among conductive blacks (Donnet, op. cit. p. 285) as having (a) higher structure (higher inter-particle void volume of the aggregate), (b) higher porosity (higher intra-particle void volume) (c) smaller particle size and (d) chemically clean surfaces.

The inter-particle void volume is commonly assessed by an Oil Absorption Number test (ASTM D2414) and the porosity is associated with surface area as measured by a BET nitrogen adsorption surface area test (ASTM D6556).

The classification of carbon blacks as conductive or extra-conductive is based primarily upon their performance in increasing the electrical conductivity of plastics. Preferred criteria for the carbon blacks useful for this invention are their classification based upon primary properties. Two important primary properties are the porosity (as measured by the BET nitrogen adsorption test) and the particle size. A useful parameter is the ratio of BET surface area in square meters per gram ($M^2$/g) to the average particle diameter in nanometers (nm). The carbon blacks in accordance with one embodiment of this invention are those having a surface area to particle diameter ratio of at least 5 $M^2$/g/nm, preferably 10 $M^2$/g/nm or preferably 20 $M^2$/g/nm and more preferably at least 30 $M^2$/g/nm.

One important property of the carbon black layer is its uniformity. In one embodiment of the present invention, the carbon black layer is formed using a drop deposit technique as further described below. The uniformity of the carbon black layer in the drop deposit technique can be aided by the use of a coating agent on the carbon black. As used herein, a coating agent is defined as a compound (or combination of compounds) applied to the carbon black particle surface which facilitates uniform formation of the carbon black layer and/or enhances composite performance.

Coating agents can be categorized as ionic (such as organic salts) and non-ionic (such as polar organic compounds) and are chosen for their capability to meet the criteria of performance noted above.

In accordance with one embodiment of the present invention, one group of coating agents is derived from water soluble organic compounds. For example, one group of such compounds is water soluble vinyl monomers. As used herein water solubility of a material is defined as solubility at 25° C. of at least 1 percent by weight in water.

Among the water soluble vinyl monomers provided in one embodiment of the present invention are the non-ionic polar molecules vinyl acetate and acrylonitrile and the ionic monomers p-styrenesulfonic acid sodium salt and methacrylic acid. Also useful are combinations of these monomers. The organic acid monomers are further useful for forming metal salts.

For example, multilayer composites may be formed using the drop deposit technique having one or more coating agents applied to the carbon black particles.

It is understood that a wide variety of metals may be used in the metal substrate layer to achieve the advantages of the present invention as described herein. In one embodiment of the invention, the metal substrate layer may include only metal materials. In another embodiment of the invention, the metal substrate layer may include metal materials and non-metal materials.

In accordance with one embodiment of the present invention, the metal substrate layer includes aluminum and/or aluminum alloys. Aluminum types can be designated by a four digit number with the major types ranging from a 1000 series with at least 99% aluminum (considered among commercially available materials to be essentially "pure" aluminum)

to an 8000 series. The first number of the designation indicates the major alloying element(s). Although the metal substrate layer may include other materials besides the aluminum and/or aluminum alloys, in one embodiment of the present invention the metal substrate layer includes only aluminum and/or aluminum alloy.

In one embodiment of the present invention, the aluminum substrate layer may be selected from any one of the following alloys and combinations thereof including aluminum alloys of the types 1145 (>99.45% aluminum and considered a "pure" aluminum), type 3003 (an aluminum alloy of 96.7% to 99.0% aluminum in which manganese is the major alloying element) and type 5052 (an aluminum alloy of 95.7% to 97.7% aluminum in which magnesium is the major alloying element). It would be expected by those skilled in the art that other aluminum alloys would also prove useful.

It is well known that a fresh aluminum or aluminum alloy surface exposed to air quickly forms a very thin (1 to 3 nanometer) layer of aluminum oxide which provides protection against further oxidation for the underlying aluminum. For some aluminum alloys this oxide layer is somewhat thicker at about 3 to 15 nanometers. For many applications yet thicker (from tens of nanometers to several micrometers) and/or more porous layers are desired for additional protection or for other applications such as the addition of colorants on the aluminum surface.

Several processes are known and practiced for producing these thicker oxidized layers on aluminum. These processes can be categorized as either chemical or electrolytic. One widely used electrolytic process is that of anodizing.

Among the chemical processes is the hydration of aluminum or aluminum alloys in deionized water (P. G. Sheasby and R. Pinner, "*The Surface Treatment and Finishing of Aluminum and Its Alloys*", Finishing Publications Ltd. $6^{th}$ edition, 2001, pp. 233-239). Hydration at temperatures of 90° to 100° C. typically produces, in addition to aluminum oxide, a coating containing a compound of aluminum called pseudoboehmite which is a partially hydrated form of boehmite (an aluminum compound with both oxide and hydroxide functionalities termed an oxyhydroxide). Layers formed by hot water in this temperature range or by steam are typically formed rapidly (in a few to several minutes) and are typically thinner and more dense (less porous) than the layers formed by anodizing. This greater layer density limits layer growth to about 1200 nanometers for purer (99.99% aluminum) compositions and thinner (60 to 600 nanometer) layers for aluminum and aluminum alloys of 99.5% aluminum and lower (Sheasby, op. cit. p. 235). Layer thickness can also vary depending upon the particular aluminum alloy used.

At lower temperatures (such as ambient room temperatures of about 20° C.) to 90° C. the layer formation proceeds more slowly and in three stages. The first stage is an induction period, followed by a second stage of pseudoboehmite formation, then followed by a third stage in which the major oxidized aluminum compound is bayerite, a form of aluminum trihydroxide. The second two stages may overlap (Sheasby, op. cit. pp. 234-235).

A variety of materials may be used to form the electrically insulating layer to achieve the advantages of the present invention. Such electrically insulating layers include, but are not limited to, oxidized metals. In one embodiment of the present invention, the above-identified forms of oxidized aluminum are provided as the electrically insulating layer in the multilayer composites. In the preferred embodiment of the present invention, the electrically insulating layer only includes oxidized aluminum as provided herein. It was also found that the "second stage" pseudoboehmite layer formed at low temperatures has a different appearance and is more porous (more like anodized layers) than those formed at 90° to 100° C. More porous layers can also be produced by chemically assisted hydration, such as with dilute or weak acids, (Sheasby, op. cit. pp. 237-238). In one embodiment, the electrically insulating layer contains at least one component selected from the group comprising aluminum oxide, pseudoboehmite and bayerite provided at a thickness of greater than 15 nanometers, alternatively at a thickness of greater than 60 nanometers, and alternatively at a thickness greater than 300 nanometers.

EXAMPLES

The following examples should not be construed to limit the scope of the present invention. These examples are provided to illustrate certain embodiments of the present invention. However, one of skill in the art would understand how the examples could be adapted without departing from the scope of the present invention.

In this invention the examples illustrating the multilayer composite are made by the drop deposit technique (as described below) which is useful for laboratory demonstration of the multilayer composite. The drop deposits are made from dilute dispersions in the range of 100 μg/ml to 1000 μg/ml of carbon black in water. Aqueous dispersions also have practical advantages in ease, safety, limited environmental impact and economics of use.

In one embodiment for making the multilayer composite, the principal steps in making the multilayer composite by the drop deposit technique are:

1. slurrying the carbon black agglomerates in water and then dispersing into aggregates via ultrasonic sonocation of dilute suspensions in the range of 100 μg/ml to 1000 μg/ml, 2. adding a coating agent to the dispersion in the range of 0.1 to 4.0 grams of coating agent per gram of carbon black, 3. photolyzing the dispersion—a useful optional step in providing for some coating agents greater deposit uniformity with the coating agent, 4. depositing the dispersion via drops onto a metal substrate layer, either pretreated or (for in situ insulating layer formation) using a dispersion with added acid for chemically assisted hydration, 5. drying the multilayer composite.

Effective multilayer composites can be made with a single type of carbon black in the carbon black layer or with blends of different carbon blacks or with sub-layers of the same or different carbon blacks in the carbon black layer. In one embodiment of the present invention, carbon black layer thicknesses range from 40 nanometers to 1000 nanometers.

The ability to disperse in water the carbon blacks useful in this invention and the deposition of these aqueous dispersions enables the relatively low cost and environmentally friendly aqueous processes which are preferred for making the deposits of dispersed carbon black in the multilayer composites of this invention. Furthermore, the relatively low cost of useful conductive carbon blacks makes these materials very cost effective light absorbers.

At any step in the dispersion preparation process, re-agglomeration may occur and require ultrasonic re-sonocation.

The drop deposit technique is the process used in the examples set forth herein. However, other coating techniques known in the art may be preferred for other processes such as those useful for larger scale and higher throughput. An example of such larger scale and higher throughput processes would be roll to roll processing of pretreated aluminum with printing of the carbon black layer on the aluminum surface.

The claims to the multilayer composite of this invention are not limited by the preparation process used to make the illustrative examples.

Example 1

Four carbon blacks: PRINTEX XE2 (Evonik Industries), BLACK PEARLS 2000 and VULCAN XC-72 (Cabot Corporation) and KETJENBLACK EC600JD (Akzo Nobel) were each dispersed at a concentration of 1000 µg/ml in 180 ml of de-ionized water made slightly acidic with 0.9 ml of 2 M acetic acid. These carbon blacks are designated as XE2, BP2K, XC-72 and KB600 respectively. The dispersions were then sonocated with a 30,000 Hz ultrasonic processor (model UP100H, Hielscher Ultrasonics, GmbH) with an MS7 sonotrobe. Sonocation was continued until each individual dispersion reached a steady state minimum light transmission measured at 700 nanometers for a 10 µg/ml sample in a 10 mm path length test tube. In addition a 1000 µg/ml dispersion of BLACK PEARLS 2000 was prepared by the above procedure with de-ionized water only, i.e. without any added acetic acid.

Portions of each of these dispersions were diluted to provide 12 ml samples at 300 µg/ml. After sonocation at 50% amplitude and 50% cycling for 2 minutes each item was allowed to sit for 2 minutes and then a 1 drop (0.05 ml) deposit was made on a type 3003 aluminum foil of nominal thickness 89 microns. Except as otherwise provided herein, the aluminum foil is the metal substrate layer with the electrically insulating layer already directly disposed thereon. This aluminum base foil was prepared by de-ionized water rinsing and drying in the ambient air draft of a laboratory exhaust hood.

The multilayer composite including the aluminum foils with the carbon black deposit were positioned on a desiccator plate in a vacuum desiccator with an open source of de-ionized water to provide a humid environment and maintained at 32° to 34° C. for 37 hours at which time each of the foils appeared dry to the extent of showing no specular reflection. The multilayer composites were then removed from the desiccator and allowed to condition for 6 hours in the ambient air draft of a laboratory exhaust hood. The multilayer composites were then further dried in a vacuum desiccator with desiccant at 22" Hg vacuum for 41 hours. The multilayer composites were then removed and tested for electrical properties. The carbon black layer thickness was calculated from the dispersion concentration and the area of the drop deposit using a density of 2 grams/cc for carbon black. The carbon black layer thickness is an average nominal thickness and is reported in nanometers (nm) to 2 significant figures.

The electrical property testing arrangement consisted of a base pedestal of two 16 mm hexagonal copper foils (0.10 mm thick) with four ends of 0.37 mm copper lead wires sandwiched between the two foils. The protruding ends were then twisted and connected through a 0.37 mm copper wire to one terminal of a digital multimeter (Model GDM-8034, GwInstek). In the voltage measuring mode, the multimeter impedance is 10 MΩ. The multilayer composite sample was placed on the copper pedestal (which rested atop an insulating plastic base) and the top of the carbon black deposit was contacted with a spiral copper probe having 15 mm length contact. The probe was made with 0.37 mm wire and connected to the other terminal of the multimeter. The pedestal was housed in a shielded (from direct light) area having an overhead clamp lamp with a 300 watt Sylvania utility clear bulb. The bulb was positioned 420 mm above the multilayer composite to be tested.

A commercial solar cell (Edmund Scientific) was used to give a reference for the 300 watt bulb intensity. The solar cell had a nominal specification of an open circuit voltage of 400-500 millivolts (mv) and a short circuit current of 80-100 milliamps.

With the 300 watt bulb on, the cell showed a voltage of 328 millivolts and a current of 28.2 milliamps. With the lamp light off (dim light) the cell showed a voltage of 2 millivolts and a current of 0.0025 milliamps.

The re-equilibration voltage of each of these multilayer composites was measured. In the potential measuring mode this voltage showed voltage decay reaching near steady state voltage (defined as decaying at less than 1% per minute) after 15 to 30 minutes. The voltage at this point is defined as voltage at decay point. After reaching the voltage at decay point, the 300 watt lamp was turned on yielding the voltage increases shown in Table 1. The recording of the voltage was terminated when the voltage ceased to increase (usually after 8 to 10 minutes). Testing of a blank aluminum foil showed no initial voltage or lamp induced voltage.

TABLE 1

| Carbon Black Type | Carbon Black Layer Thickness (nm) | Re-equilibration Voltage (mv) | Voltage at Decay Point (mv) | Lamp Induced Voltage Increase (mv) |
|---|---|---|---|---|
| BP2K | 200 | 577 | 77 | 50 |
| KB600 | 230 | 618 | 77 | 38 |
| XE2 | 200 | 167 | 8 | <2 |
| XC-72 | 180 | 339 | 9 | <2 |
| BP2K (no acetic acid) | 210 | <2 | <2 | <2 |

This example shows the effects on multilayer composite performance of different carbon blacks without any coating agent and the effect of acetic acid in the dispersion versus no acetic acid.

Example 2

Two carbon black dispersions were prepared by adding coating agents to a portion of the BLACK PEARLS 2000 dispersion without added acetic acid, as described in example 1.

First, portions of the BP2K dispersion were diluted to give 12 ml samples at 300 µg/ml. To each dispersion was added a coating agent of either p-styrenesulfonic acid sodium salt (SSS) or acrylonitrile (AN) to give a weight ratio of the coating agent to carbon black of 0.6 grams per 1 gram of carbon black. While stirring these dispersions were photolyzed with a 5.5 watt cold cathode, low pressure, mercury arc, gaseous discharge lamp (Pen Ray). The principal output of this lamp was at 254 nanometers. The lamp was immersed in the dispersion for 35 mm of the 54 mm lamp length. The sample was photolyzed for 16 cycles of 1 minute on and 1 minute off.

Aluminum foils with an electrically insulating layer were also prepared as follows. Samples of aluminum foils prepared as described in example 1 were treated by the deposition of 0.15 ml of a solution of 180 µg/ml of acetic acid in de-ionized water.

The aluminum foils were maintained in a vacuum desiccator with an open source of water to maintain a humid environment at 33° to 35° C. for 48 hours. The aluminum foils were then conditioned in the ambient air draft of a laboratory exhaust hood for 12 hrs. The treated foils were then dried in a vacuum desiccator with desiccant for 36 hrs. at 22" Hg vacuum.

The areas where the acetic acid had contacted the aluminum foils exhibited distinct "footprints" which showed interference multi-colors of reflected light indicative of thin films at interfaces. This layer showed a thickness of 300 nanometers. Using the electrical testing equipment as described in Example 1 showed an electrical resistance greater than 20 MΩ compared to 5 ohms for the untreated aluminum foils.

Multilayer composites were prepared by casting one drop (0.05 ml) dispersions on both an untreated foil and on a high resistance treated foil and processed through the same sequence as described for the samples in Example 1. The re-equilibration voltage, the voltage at the decay point and light induced voltage yielded the results shown in Table 2.

TABLE 2

| Coating Agent on Carbon Black BP2K | Insulating layer on foil | Carbon Black Layer Thickness (nm) | Re-equilibration Voltage (mv) | Voltage at Decay Point (mv) | Lamp Induced Voltage Increase (mv) |
|---|---|---|---|---|---|
| None | No | 250 | 16 | 10 | 20 |
| None | Yes | 200 | 430 | 80 | 42 |
| SSS | No | 270 | <2 | <2 | <2 |
| SSS | Yes | 150 | 580 | 203 | 76 |
| AN | No | 270 | <2 | <2 | <2 |
| AN | Yes | 200 | 580 | 101 | 55 |

This example shows the effects on the multilayer composite performance of coating agents versus none and the effects of a preformed electrically insulating layer versus none on the aluminum foil.

Example 3

Deposits of carbon black dispersions were made on pretreated high resistance aluminum foils prepared as described in example 2. Multiple layers were deposited using the techniques of examples 1 and 2. Each foil was processed through the sequence before adding an additional layer. In addition to the BP2K dispersion, multiple layer deposits were made with dispersions prepared (following the procedures described in example 2) with the coating agents p-styrenesulfonic acid sodium salt (SSS) and methacrylic acid (MAA). The electrical properties of the foils with multiple coats are shown in Table 3.

TABLE 3

| Coating Agent on Carbon Black BP2K | Number of deposited layers | Carbon Black Total Layer Thickness (nm) | Re-equilibration Voltage (mv) | Voltage at Decay Point (mv) | Lamp Induced Voltage Increase (mv) |
|---|---|---|---|---|---|
| None | 1 | 150 | 585 | 132 | 47 |
| | 2 | 420 | 435 | 66 | 28 |
| | 3 | 760 | 3 | 2 | 4 |
| SSS | 1 | 180 | 681 | 278 | 98 |
| | 2 | 410 | 606 | 199 | 81 |
| | 3 | 523 | 634 | 152 | 77 |
| MAA | 1 | 110 | 782 | 136 | 46 |
| | 2 | 500 | 629 | 170 | 44 |
| | 3 | 700 | 601 | 92 | 43 |
| | 4 | 850 | 546 | 168 | 98 |

This example shows the effects on multilayer composite performance of multiple deposits of carbon black dispersions and the effects of two different coating agents versus no coating agent.

Example 4

A 20 ml portion of the 1000 µg/ml dispersion of BLACK PEARLS 2000 carbon black prepared with acetic acid as described in example 1 was charged with the coating agents 1-vinyl-2-pyrrolidone (NVP), vinyl acetate (VA), itaconic acid (ITA) and p-styrenesulfonic acid sodium salt (SSS) to give a weight ratio of coating agent to carbon black of 1.17 and mole fractions as: NVP (0.62), VA (0.14), ITA (0.12) and SSS (0.12). A portion of this dispersion was diluted to 300 µg/ml and then photolyzed with a 5.5 watt cold cathode, low pressure, mercury arc, gaseous discharge lamp (Pen Ray). The principal output of this lamp was at 254 nanometers. The photolysis lamp was immersed in the dispersion for 35 mm of the 54 mm lamp length. The sample was photolyzed for 16 cycles of 1 minute on and 1 minute off.

A 0.2 ml portion of this dispersion was drop deposit cast on an aluminum foil prepared as described in example 1. An additional dispersion was prepared from this dispersion by adding 0.5% by weight aqueous solutions of cobalt II acetate tetrahydrate, copper II acetate and nickel II acetate tetrahydrate. The salt solutions were added at equal molar amounts with the total moles of salt charge equal to 0.5 times the moles of ITA in the dispersion. A 0.2 ml deposit of this metal salt containing dispersion was also then drop cast on a type 3003 aluminum foil.

These drop cast multilayer composite foils were placed in a vacuum desiccator with an open source of water to provide a humid environment. They were held for 7 days and maintained at a temperature of 29° to 34° C. The multilayer composite foils were then removed from the desiccator and conditioned in the ambient air draft of a laboratory exhaust hood for 6 hrs. They were then placed in a vacuum desiccator with desiccant and dried at a vacuum level of 21" Hg vacuum for 38 hrs. They were tested using the equipment and procedures described in example 1 except that the bulb in the lamp was a 150 watt GE soft white bulb and the probe used was a 10 mm length copper spiral probe. The reference solar cell with the 150 watt bulb gave a voltage of 311 millivolts and a current of 21.2 milliamps. Shown in table 4 are the results from this test.

TABLE 4

| Metal salts added to coating agent | Carbon Black Layer Thickness (nm) | Re-equilibration Voltage (mv) | Voltage at Decay Point (mv) | Lamp Induced Voltage Increase (mv) |
|---|---|---|---|---|
| No | 210 | 651 | 432 | 98 |
| Yes | 230 | 744 | 459 | 99 |

This example shows the effects of the addition of metals salts to the dispersion with a blend of coating agents.

Example 5

A BP2K carbon black with SSS coating agent prepared as described in example 2 was deposited on a pretreated high resistance layer aluminum foil and processed like the SSS deposit foil described in Example 2. This deposit had a carbon black layer thickness of 150 nanometers. The multilayer composite foil showed a re-equilibration voltage of 628 millivolts which decayed in dim light after 810 minutes (13 hours and 30 minutes) to 62 millivolts. At this point the lamp with the 300 watt bulb was turned on and showed a voltage increase to 98 millivolts (an increase of 36 millivolts) in 8 minutes. The lamp was then turned off and the multimeter lead disconnected.

After 20 minutes in dim light, the voltage had increased from 98 millivolts to 425 millivolts. This voltage increase upon re-equilibration (without the charge drain in the voltage measuring mode) demonstrates the self recharging nature of this multilayer composite.

In a separate experiment with this multilayer foil, the re-equilibration voltage was measured showing 629 millivolts which decayed to 57 millivolts after 24 minutes. This multilayer foil was removed from the pedestal and placed in bright sunlight (the moving requiring 30 seconds). The multilayer foil remained in the bright sunlight for 3 minutes and was then replaced on the pedestal (requiring 30 seconds to replace the foil). The voltage was 315 millivolts (an increase of 258 millivolts). An additional test showed a voltage increase without the sunlight and with the leads disconnected (i.e. dim light re-equilibration without charge drain) of 173 millivolts in 4 minutes.

This example demonstrates the multilayer composite retention of voltage in dim light, the self re-charging nature of the multilayer composite and sunlight induced composite voltage increase.

Example 6

Three carbon blacks: PRINTEX XE2, BLACK PEARLS 2000 and VULCAN XC-72 were each dispersed at a concentration of 1000 µg/ml in 300 ml of de-ionized water made slightly acidic with 1.5 ml of 2 M acetic acid. The dispersions were then sonocated with a 30,000 Hz ultrasonic processor (model UP100H, Hielscher Ultrasonics, GmbH) with an MS7 sonotrobe. Sonocation was continued until the dispersion reached a steady state minimum light transmission measured at 700 nm for a 10 µg/ml sample in a 10 mm path length test tube.

Portions of 17 ml of each of these three dispersions were combined in a 60 ml bottle beaker. The blend was charged with the coating agents 1-vinyl-2-pyrrolidone (NVP), vinyl acetate (VA), itaconic acid (ITA) and p-styrenesulfonic acid sodium salt (SSS) to give a weight ratio of coating agent to carbon black of 1.17 and mole fractions as: NVP (0.62), VA (0.14), ITA (0.12) and SSS (0.12).

While stirring this dispersion was photolyzed following the procedure described in Example 2 except that the sample was photolyzed for 8 cycles of 2 minutes on and 2 minutes off.

A sample of this dispersion was then diluted with de-ionized water to give a concentration of 300 µg/ml to which was added 0.5% by weight aqueous solutions of cobalt II acetate tetrahydrate, copper II acetate and nickel II acetate tetrahydrate. The salt solutions were added to give an equimolar distribution of cobalt, copper and nickel with the total charge of moles of metal ions equal to the moles of itaconic acid.

A drop deposit of 0.2 ml of this dispersion was then cast on an aluminum foil prepared as described in example 1. The multilayer composite foil was then conditioned for 96 hours at 28° to 32° C. in a closed desiccator with an open source of water to maintain a humid environment. After conditioning the foil appeared visually dry. It was then placed in the ambient air draft of a laboratory exhaust hood for 24 hours to further equilibrate and then dried in a vacuum desiccator with desiccant. The desiccator was pumped to 23 inches of mercury vacuum and allowed to stand for 48 hours. This multilayer composite foil had a nominal carbon black layer thickness of 290 nanometers.

Testing using the equipment described in Example 4 showed a re-equilibration voltage of 772 millivolts decreasing in dim light over a period of 34 hours, 34 minutes to 90 millivolts. This multilayer composite foil was then later put into bright sunlight for 10 minutes after which it showed a voltage increase to 611 millivolts which decayed in dim light over 31 minutes to 131 millivolts. Putting this multilayer foil back into bright sunlight for 10 minutes showed a dim light voltage of 604 millivolts decaying to 144 millivolts over a period of 64 minutes.

This example shows the dim light retention of voltage of the multilayer composite over an extended period of time and the effect of sunlight to produce voltage increase.

Example 7

Seven different carbon blacks: VULCAN XC-72 and BLACK PEARLS 2000 (Cabot Corporation), FW200, PRINTEX L6, PRINTEX XE2 and PRINTEX XE2-B (Evonik Industries) and KETJENBLACK EC600JD (Akzo Nobel) were each dispersed at 1000 µg/ml without acetic acid using the process as described in example 1. These carbon blacks are designated as XC-72, BP2K, FW200, L6, XE2, XE2-B and KB600 respectively. Each dispersion was then diluted with de-ionized water to 400 µg/ml and charged with the coating agent p-styrenesulfonic acid sodium salt to give a weight ratio of coating agent to carbon black of 0.5. The dispersions were then photolyzed as described in example 2.

Drop deposits (0.05 ml) of each of these dispersions were made on type 3003 aluminum foils pretreated to provide an insulating layer following the procedure of example 2 except that the foils had been maintained at 32° C. for 70 to 86 hours, rinsed with de-ionized water and dried in the ambient air draft of a laboratory exhaust hood omitting the final step of drying under vacuum in a desiccator. Testing as in example 2 showed greater than 20 MΩ resistance.

The drop deposit foils were maintained at 29° to 30° C. in a vacuum desiccator with an open source of water to maintain a humid environment. After 48 hours the multilayer composite foils showed loss of specular reflection. The multilayer composite foils were conditioned in the ambient air draft of a laboratory exhaust hood for 24 hrs and then dried in a vacuum desiccator with desiccant at 22" Hg vacuum for 42 hrs. The multilayer composite foils were tested as described in example 1 yielding the results shown in Table 5.

TABLE 5

| Carbon Black Type | Carbon Black Layer Thickness (nm) | Re-equilibration Voltage (mv) | Voltage at Decay Point (mv) | Lamp Induced Voltage Increase (mv) |
|---|---|---|---|---|
| BP2K | 130 | 724 | 327 | 109 |
| XE-2B | 120 | 512 | 256 | 84 |
| L6 | 140 | 603 | 60 | 49 |
| XC-72 | 240 | 467 | 31 | 24 |
| FW200 | 130 | 431 | 102 | 116 |
| KB600 | 140 | 652 | 174 | 94 |
| XE-2 | 140 | 191 | 20 | 74 |

This example illustrates the effects on multilayer composite performance of different carbon blacks with the coating agent p-styrenesulfonic acid sodium salt.

Example 8

Foils of three different aluminum types (1145, 3003, and 5052) were treated with 180 µg/ml aqueous acetic acid solutions following the procedure described in example 7. These foils had nominal thicknesses of 76, 89, and 76 microns respectively.

The foils prepared from 1145 and 5052 type aluminum showed a dark gray appearance as contrasted with the multicolor or pale yellow appearance of the 3003 type. The 1145 and 5052 foils pretreated by this process proved to be very difficult to reproduce especially compared to the deionized water treatment as described in example 9.

This treatment yielded foils with greater than 20 MΩ resistance tested as in example 2.

Drop deposits of 0.05 ml of two of the different coated carbon black dispersions described in example 7 (BP2K and XE2-B) were then made on the treated foils. The multilayer composite foils were maintained at 29° to 30° C. in a closed vacuum desiccator with an open source of water to maintain a humid environment. After 55 hours the deposits showed loss of specular reflection. The multilayer composite foils were placed in the ambient air draft of a laboratory exhaust hood for 16 hours and then dried in a vacuum desiccator with desiccant under 21" Hg vacuum for 42 hours. The multilayer composite foils were tested using the procedures and equipment described in example 1 yielding the results shown in Table 6.

TABLE 6

| Carbon Black Type | Aluminum Type | Carbon Black Layer Thickness (nm) | Re-equilibration Voltage (mv) | Voltage at Decay Point (mv) | Lamp Induced Voltage Increase (mv) |
|---|---|---|---|---|---|
| BP2K | 1145 | 150 | 998 | 658 | 79 |
| BP2K | 3003 | 160 | 681 | 293 | 85 |
| BP2K | 5052 | 210 | 1210 | 581 | 123 |
| XE-2B | 1145 | 200 | 588 | 242 | 120 |
| XE-2B | 3003 | 120 | 746 | 298 | 94 |
| XE-2B | 5052 | 120 | 1354 | 744 | 130 |

This example illustrates the effects on multilayer composite performance comparing three different aluminum types each with two different coated carbon blacks.

Example 9

Foils of aluminum types 1145 and 5052 (76 micron thickness) were rinsed with tap water and then with deionized water. The foils were then immersed in deionized water for different lengths of time at different temperatures. For processes A, B and C the conditions were respectively 97° to 98° C. for 12 minutes, 38° C. for 68 hours and 23° C. for 28 days. The foils were dried in the draft of a laboratory exhaust hood and then sanded on one side first with 1500 and then 2000 grit sandpaper to remove the surface layer sufficiently to provide a conductive surface next to the measurement pedestal. The foils were then rinsed again with deionized water and dried in the laboratory exhaust hood draft. These foils showed the same high resistance (>20 MΩ) as described in example 2.

Foils from processes A, B, and C each showed a different appearance. Foils from process A showed an appearance much like its untreated base foil whereas foils from process C showed an appearance of a grayish-brown color. Analysis of the layers on foils from processes A and C showed a composition consistent with a composition of aluminum oxide and pseudoboehmite with the layer produced by process C being more porous than the layer produced by process A. The thickness of the layer produced by process A was 390 nanometers. The foils produced by process B showed a bright white appearance and a composition consistent with bayerite.

A set of carbon black dispersions were prepared from Black Pearls 2000 following the procedures of example 2. The carbon black concentration was 600 μg/ml. Samples were prepared with one having no added coating agent and two with p-styrenesulfonic acid sodium salt (SSS) at 1.0 gram of SSS per gram of carbon black. One of these dispersions with added SSS was photolyzed while stirring as in example 2 except that the photolysis was for 8 cycles of 10 seconds on and 20 seconds off. Drop deposits of 10 μl of dispersion were then cast onto various base foils. The multilayer composite foils were placed on a desiccator plate in a desiccator with an open source of water to maintain a humid environment and then heated at 29° to 31° C. for 32 to 38 hours. At this time the multilayer composite foils showed loss of specular reflection. They were removed from the desiccator and dried in the ambient air draft of a laboratory exhaust hood for 6 hours. They were then dried in a vacuum desiccator with desiccant and pumped to 25 inches Hg vacuum and held for 36 hours. At this point the multilayer composite foils were removed and tested for electrical properties using the equipment and procedures of example 1 except that the 15 millimeter probe was replaced with a U shaped probe of length 3.5 millimeters. Shown in Table 7 are the results of these measurements.

TABLE 7

| Aluminum Type | Base Foil Process | SSS:Carbon Black Ratio | Photolysis | Carbon Black Thickness (nm) | Re-equilibration Voltage (mv) | Voltage at Decay Point | Lamp Induced Voltage |
|---|---|---|---|---|---|---|---|
| 1145 | A | 1.0 | Yes | 170 | 923 | 75 | 59 |
| 1145 | A | 1.0 | No | 100 | 851 | 218 | 63 |
| 1145 | B | 1.0 | Yes | 170 | 718 | 71 | 10 |
| 1145 | B | 1.0 | No | 120 | 850 | 245 | 23 |
| 1145 | C | 1.0 | No | 140 | 1109 | 589 | 51 |
| 5052 | A | 1.0 | No | 130 | 752 | 242 | 75 |
| 5052 | A | 0 | No | 110 | 367 | 62 | 39 |
| 5052 | B | 1.0 | No | 120 | 975 | 545 | 34 |
| 5052 | B | 0 | No | 150 | 734 | 42 | 24 |
| 5052 | C | 1.0 | No | 120 | 1182 | 322 | 36 |
| 5052 | C | 0 | No | 140 | 1198 | 316 | 56 |
| 5052 | B | 1.0 | Yes | 190 | 921 | 267 | 37 |
| 5052 | B | 1.0 | No | 110 | 997 | 386 | 36 |

This example shows the effects of: aluminum type, different processes for making the insulating layer, SSS concentration and omitting the photolysis step.

Although the present invention has been disclosed in terms of a preferred embodiment, it will be understood that numerous additional modifications and variations could be made thereto without departing from the scope of the invention as defined by the following claims:

The invention claimed is:

1. A multilayer composite comprising
a metal substrate layer,
an electrically rectifying layer directly disposed on said metal substrate layer wherein said electrically rectifying layer contains at least one component selected from the group consisting of aluminum hydroxide bayerite and aluminum oxy-hydroxide pseudoboehmite, and
a light absorbing layer directly disposed on said electrically rectifying layer, wherein said light absorbing layer includes carbon black having an absorption length for 700 nanometer light greater than 30 nanometers and less than 80 nanometers and a ratio of BET surface area to particle diameter of at least 10 square meters per gram per nanometer.

2. The multilayer composite of claim 1 wherein said metal substrate layer includes aluminum or an aluminum alloy.

3. The multilayer composite of claim 1 wherein said carbon black has a ratio of BET surface area to particle diameter of at least 20 square meters per gram per nanometer.

4. The multilayer composite of claim 1 wherein said carbon black has a ratio of BET surface area to particle diameter of at least 30 square meters per gram per nanometer.

5. The multilayer composite of claim 1 wherein said light absorbing layer has a thickness that is greater than 40 nanometers and less than 1000 nanometers.

6. The multilayer composite of claim 1 wherein said electrically rectifying layer has a thickness greater than 60 nanometers.

7. The multilayer composite of claim 1 wherein said electrically rectifying layer has a thickness greater than 300 nanometers.

8. The multilayer composite of claim 1 wherein said carbon black is provided with a coating agent.

9. The multilayer composite of claim 8 wherein said coating agent is selected from the group consisting of acrylonitrile, vinyl acetate, methacrylic acid and p-styrenesulfonic acid sodium salt.

10. The multilayer composite of claim 9 wherein said coating agent is p-styrenesulfonic acid sodium salt.

11. The multilayer composite of claim 1 wherein said multilayer composite has a re-equilibration voltage of at least 500 millivolts.

12. The multilayer composite of claim 1 wherein said multilayer composite has a re-equilibration voltage of at least 100 millivolts.

13. The multilayer composite of claim 1, wherein said metal substrate layer includes only aluminum or an aluminum alloy, said electrically rectifying layer includes only aluminum hydroxide bayerite or aluminum oxy-hydroxide pseudoboehmite aluminum hydroxides or oxy-hydroxides, and said light absorbing layer includes only carbon black or carbon black coated with a coating agent.

14. A solar cell including the multilayer composite of claim 1.

15. The multilayer composite of claim 1 wherein said electrically rectifying layer has a thickness greater than 15 nanometers.

16. A multilayer composite comprising
a metal substrate layer comprising aluminum or an aluminum alloy,
an electrically rectifying layer directly disposed on said metal substrate layer, wherein said electrically rectifying layer includes at least one component selected from the group consisting of aluminum oxy-hydroxide pseudoboehmite and aluminum hydroxide bayerite, and
a light absorbing layer directly disposed on said electrically rectifying layer, wherein said light absorbing layer includes carbon black having an absorption length for 700 nanometer light greater than 30 nanometers and less than 80 nanometers and a ratio of BET surface area to particle diameter of at least 30 square meters per gram per nanometer and said light absorbing layer has a thickness greater than 40 nanometers and less than 1000 nanometers, wherein
said multilayer composite has a re-equilibration voltage of at least 500 millivolts.

17. A solar cell including the multilayer composite of claim 16.

* * * * *